United States Patent Office 3,597,377
Patented Aug. 3, 1971

3,597,377
BUTYL RUBBER ADHESIVE AND CAULKING COMPOSITIONS
Anthony J. Berejka, Cranford, and Anthony Lagani, Jr., Newark, N.J., assignors to Esso Research and Engineering Company
No Drawing. Filed May 6, 1968, Ser. No. 727,002
Int. Cl. C08d 9/12
U.S. Cl. 260—27                    5 Claims

ABSTRACT OF THE DISCLOSURE

An adhesive sealant base comprising butyl rubber and a tackifier is prepared by heat treating in the presence of (1) a halogenated phenol aldehyde resin or (2) a phenol aldehyde resin in conjunction with a halide containing activator.

BACKGROUND OF THE INVENTION

In the preparation of adhesive bases it is desirable to blend the elastomer used with a tackifier such as polyterpene resin, wood rosin or pentaerythritol esters of hydrogenated rosin, β-pinene resin, α-pinene resin, terpene-phenolic resins, non-reactive phenol formaldehyde resins. Where the elastomer is butyl rubber, however, difficulty is encountered in the preparation of the adhesive due to the tendency of butyl rubber to cold flow. The term "cold flow" is used to describe the tendency of a polymer to flow at room temperature and conform to the shape of its container. Adhesive bases made from uncured butyl lack sufficient stiffness to restrict cold flow.

A solution to the problem is to cure the rubber, at least partially, using conventional cure systems such as p-quinone dioxime and zinc oxide.

It has long been known that butyl rubber may be cured using a condensation polymer of p-alkyl phenol and formaldehyde, see U.S. Pat. 2,701,895, which is incorporated herein by reference. Resin cure systems are preferred over sulfur accelerated or other conventional cure systems since they are more easily controlled from the process standpoint and result in better scorch and aging properties. Similarly, the polyhalomethyl phenols are known to be effective curing agents for butyl rubber; see for example U.S. Pats. 3,093,613 and 3,165,496, incorporated herein by reference.

In order to process butyl rubber which is partially cured by using the above phenol aldehyde halogenated or unhalogenated resins in conventional adhesive and sealant mixers, a diluent is required. Where the rubber composition is to be used in adhesives and sealants, the choice of diluents is important. Preferably, in these cases the diluents are polyterpene resins or modified wood rosins since such diluents are tackifiers and also serve as adhesion promoters. The normally used diluents such as process oils have a detrimental effect on adhesion properties which can be achieved with the rubber base.

It has been proposed that the mechanism by which a phenol alcohol, such as dimethylol phenol, cures butyl rubber is by attack of a quinone methide, formed by dehydration of the phenol alcohol, at an α-methylene of the rubber hydrocarbon. For example:

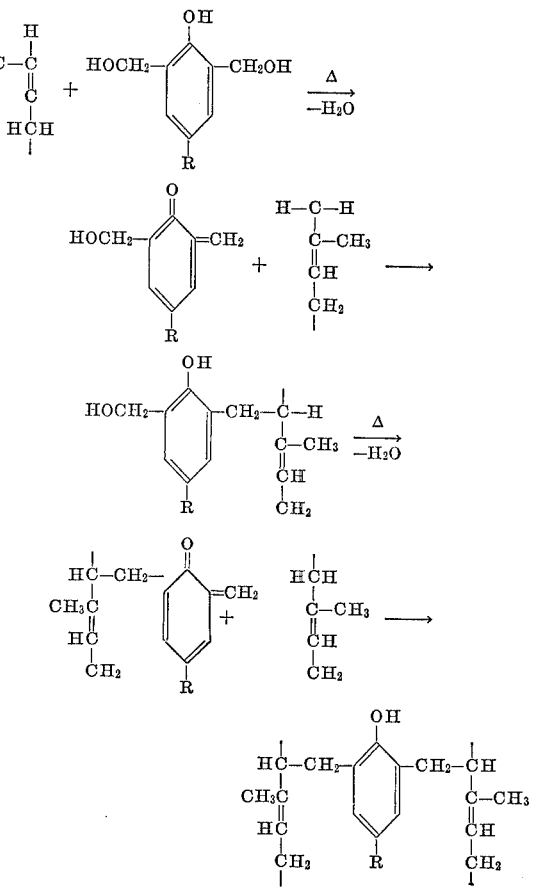

See Martin, The Chemistry of Phenolic Resins, pp. 203–207, John Wiley and Sons (1956).

The mechanism proposed for the brominated counterparts, i.e.:

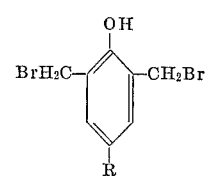

is similar, except that rather than dehydration, dehydrohalogenation occurs, e.g.:

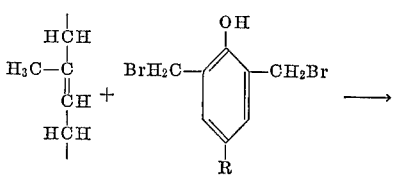

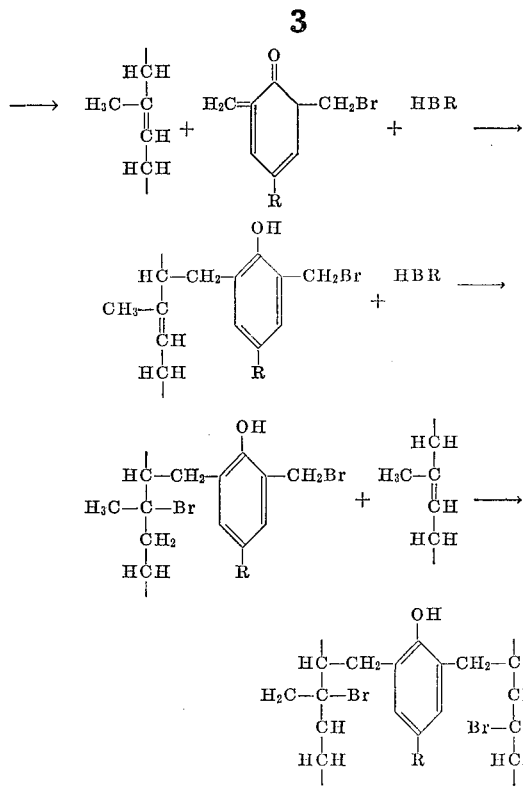

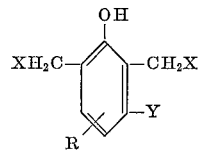

It is noted that the product is identical to that derived from the methylol phenol except that there has been addition of the HBr to the double bond. See Van der Meer, "Rubber Chemistry & Technology," 18, 853, 859 (1945). Hence, it would seem to follow, those systems which can be cured by methylol phenols are curable with the halo-substituted compound. Since the mechanism of cure is substantially identical, it would be logical to conclude that where the methylol phenols are inoperative so too the halo-substituted compounds would also be inoperative.

In the presence of the aforementioned tackifiers, a resin cure of butyl rubber cannot be accomplished with the methylol phenols. Not wishing to be bound by theory, it is thought that the resin curative preferentially reacts with the tackifier.

SUMMARY OF THE INVENTION

Surprisingly, it has been found that tackifier-butyl rubber blends may be cured sufficiently to be suitable for use as adhesive bases by curing with halogenated phenol-aldehyde resins. Additionally, cures may be accomplished by the use of phenol-aldehyde resins in the presence of a halide-containing activator.

The phenol-aldehyde and halogenated phenol aldehyde resins are used in the art interchangeably for curing butyl rubber, the primary advantage being more rapid cures at lower concentrations of the halogenated compound. Surprisingly, however, increasing the amount of unhalogenated phenol aldehyde resin or the cure cycle time does not result in useful cures of the butyl rubber/tackifier system with the unhalogenated resin.

DETAILED DESCRIPTION

This invention is directed toward a butyl rubber composition suitable for use in adhesive or sealant manufacture. The expression "butyl rubber" as employed in the specification and claims is intended to include copolymers made from a polymerization reactant mixture having therein about 70–99.5% by weight of an isoolefin which has about 4–7 carbon atoms and about 30–0.5% by weight of a conjugated multiolefin having about 4–14 carbon atoms. The resulting copolymer contains 85–99.5% of combined isoolefin and about 0.5 to about 15% of combined multiolefin. The term "butyl rubber" is described in an article by R. M. Thomas et al. in Industrial Engineering and Chemistry, vol. 32, pp. 1283 et seq., October 1940.

The term "phenol-aldehyde resin" as used in the specification and claims is intended to include both monocyclic and polycyclic phenol dialcohols prepared from para-alkyl-phenol and formaldehyde in the presence of alkali as shown by Honel in U.S. Pat. 1,996,069 or Charlton et al., in U.S. Pat. 2,364,192 and others, and by modifications which are well known to the art. Such phenol dialcohols are more fully described in U.S. Pat. 2,701,895 which is incorporated herein by reference.

The term "halogenated phenol-aldehyde resins" as used in the specification and claims is intended to mean both monomeric and polymeric halomethyl hydrocarbon-substituted phenols. The monomeric form of these curing agents falls under the general formula:

wherein R is an alkyl, aryl or alkenyl hydrocarbon containing 4 to 16 carbon atoms located in the meta or para position (4–5 position); X is a halogen such as fluorine, chlorine or iodine; and Y is hydrogen or hydroxy.

Products obtained by the controlled halogenation of methylol containing resins prepared by the condensation of an aldehyde, e.g. formaldehyde with the following representative phenols: 4-tertiary-butyl phenol, 4-phenyl phenol, and 4-monoxy phenol are within the purview of the halogenated phenol aldehyde resins suitable for use in this invention. In the halogenation of these resins, halogenation is not necessarily complete. Therefore, in addition to halogen, the molecule may contain methylol groups. These halomethyl hydrocarbon-substituted phenol compounds are more fully desscribed in U.S. Pats. 3,165,496 and 3,093,613 which are incorporated herein by reference.

Illustrative of the phenol aldehyde resins which may be used in the practice of this invention are Schenectady SP–1045 and Amberol ST–137, heat reactive phenol formaldehyde resins believed to be the reaction product of 1 mole of p-octylphenol, 2 moles of formaldehyde and 1 mole of sodium hydroxide, the alkali being carefully neutralized after the condensation is complete. It is a resinous solid.

Illustrative of the halogenated phenol aldehyde resins which may be used in the practice of this invention are Schenectady Chemicals Inc. resins SP–1055 and SP–1056. Both resins are heat reactive bromomethyl alkylated phenolic resins with a melting point of about 135° C. The SP–1055 resin has a methylol content of about 11.25% and a bromine content of about 4.0%, whereas the SP–1056 resin has a methylol content of about 10 to 12.5% and a minimum bromine content of 6.0%. Preferably, the phenol aldehyde resins and halogenated phenol aldehyde resins of this invention are incorporated in the rubber base at about 0.5 to 5 parts per hundred (phr.), based on the rubber; more preferably, about 1 to about 3 phr., e.g. 2.5 phr.

Illustrative of the halide containing activators suitable for use in conjunction with the phenol aldehyde resins of this invention are metal halides such as tin chloride, ferric chloride, zinc chloride, etc. The term "halide containing activator" as used in the specification and claims includes organo metal halides, e.g. organotin halides such as butyl tin trichloride.

Other suitable halide containing activators are halogen acids such as HI, HCl and HBr. Preferably, these acids are adsorbed within the pores of a zeolitic molecular sieve; see U.S. Pat. 3,036,986 which is incorporated herein by reference.

Other suitable acids which may be adsorbed on such zeolitic molecular sieves include trifluoroacetic acid and chloroacetic acid.

The halide containing activators are incorporated at about 0.1 to about 3.0 parts per hundred based on the rubber; preferably 0.75 to about 1.5 phr., e.g. 1.0. Where a metal halide is used in conjunction with an unbrominated phenol aldehyde resin, the resin is incorporated into the rubber mix at about 0.5 to about 5 phr., based on the rubber; more preferably about 1 to about 3, e.g. 2.5 phr.

The tackifiers which may be used in the practice of this invention include polyterpene resins, wood rosins, pentaerythritol esters of hydrogenated rosins, β-pinene resins, abietic acid, α-pinene resins, terpene phenolic resins, non-reactive phenol formaldehyde resins. The term "non-reactive phenol formaldehyde resin" is intended to mean thermoplastic phenol formaldehyde resins which do not contain terminal methylol groups or α-halomethyl groups and hence are not heat reactive. Illustrative of such resins is Amberol ST-137X (Rohm and Haas). These tackifiers are incorporated into the rubber base at about 3 to about 60 phr., based on the rubber, preferably from about 5 to about 25, more preferably about 10 to 15 parts per hundred. It has been found, however, that at least 3 phr. is required; preferably at least 5 phr. is used in order to properly process the rubber base.

Although the preferred compositions of this invention contain no process oils, for economic reasons it may be desirable to replace part of the tackifier-diluent with some process oils. Either naphthenic or paraffinic process oils may be used at about 3 to about 15 phr. based on the rubber. In order to obtain the proper tackiness, the process oil should not make up more than one-half of the tackifier-process oil diluent.

The blends of butyl rubber, tackifier and curative are heat treated by heating, with mixing, at about 275° F. to about 375° F. for about 2 to about 15 minutes, more preferably at about 325° to about 350° F. for about 5 to 10 minutes, the longer times being associated with the lower temperatures. Although higher temperatures may be used, there is no apparent advantage from the standpoint of product quality and results in some difficulty in controlling heat treating times. The desired control parameters for particular compositions, i.e. time-temperature relationship, are readily ascertained by measuring Mooney viscosity as a function of time and running the process at the level of phenol aldehyde resin which results in the desired degree of cure. For the products of this invention, the Mooney viscosity will preferably range between 50 and 120 at 260° F., more preferably about 60 to about 100; the lower values being associated with the higher tackifier-diluent concentration, i.e. greater than 25 phr. based on the rubber. It will be obvious to one skilled in the art that the same degree of heat treating may be achieved by a variation of time-temperature relationships.

The term "heat treating" as described above, refers to the partial cure which results in heating the rubber compositions of this invention in the manner described.

TABLE I.—HEAT TREATED BUTYL—DIFFERENCE IN CURE RATE BETWEEN BROMINATED AND NON-BROMINATED PHENOLIC RESINS

| Compound | A | B | C | D | E | F | G |
|---|---|---|---|---|---|---|---|
| Ingredients: | | | | | | | |
| Enjay Butyl 365 | 100 | 100 | 100 | 100 | 100 | 100 | 100 |
| Schenectady SP-1045 [1] | 1.0 | 1.0 | 1.0 | | | | |
| Schenectady SP-1055 [2] | | | | 1.0 | 1.0 | 1.0 | 1.0 |
| Heat treated: | | | | | | | |
| At (in ° F.) | | 325 | 325 | 350 | 325 | 325 | 350 |
| For (in minutes) | | 5 | 2.5 | 2.5 | 5 | 2.5 | 2.5 |
| Mooney viscosity (ml. at 260° F.): | | | | | | | |
| 1 plus 3 min. reading | 33 | 79 | 62 | 79 | 91 | 77 | 85 |
| 1 plus 10 min. reading | 29 | 78 | 56 | 77 | 87 | 67 | 82 |

[1] Rubber curing phenolic resin.
[2] Brominated phenolic resin.

It is readily evident that an increase in time or temperature will result in equivalent cures with either resin. For example, a 2.5 min. cure at 350° F. with about 1 part per hundred of phenol aldehyde resin (Compound D) is equivalent to a 5 minute cure at 325° F. (Compound B) or a 2.5 minute cure at 325° F. when the halogenated SP-1055 is used (Compound F).

EXAMPLE 2

Various butyl rubber compositions were prepared and cured in the presence of the polyterpene resin (Piccolyte S-115). Piccolyte S-115 is a widely used tackifying resin having a 115° C. softening point and believed to be based on β-pinene. These blends were cured at about 325° F. for varying lengths of time. The results are shown in Table II.

TABLE II.—HEAT TREATED BUTYL—COMPARISON OF BROMINATED AND NON-BROMINATED RESIN HEAT TREATMENT IN THE PRESENCE OF A POLYTERPENE

| Compound | A | B | C | D |
|---|---|---|---|---|
| Ingredients: | | | | |
| Enjay Butyl 365 | 100 | 100 | 100 | 100 |
| SP-1045 (non-brominated) | | | 2.5 | 2.5 |
| SP-1055 (brominated) | | 2.5 | | |
| Piccolyte S-115 [1] | 15 | 15 | 15 | 15 |
| Heat treated: | | | | |
| At (in ° F.) | | 325 | 325 | 325 |
| For (in minutes) | | 5 | 5 | 10 |
| Mooney viscosity (ml. at 260° F.): | | | | |
| 1 plus 3 minute reading | 30 | 78 | 53 | 52 |
| 1 plus 10 minute reading | 27 | 74 | 53 | 50 |

[1] 155° C. M.P. polyterpene resin.

It is seen where no curing resin is used, the Mooney viscosity is very low, i.e. 30. Where the tackifier is added to the blend and a non-brominated phenol aldehyde resin is used (SP-1045), after a cure of 5 minutes at 325° F., the Mooney viscosity, is still only 53; doubling the cure time to 10 minutes has no effect. Increase in Mooney viscosity for Compounds C and D may be due, in part, to condensation of the phenol aldehyde resin, which is heat reactive and not resin-rubber cure reaction. Conversely, in the presence of the same tackifier, the brominated resin (SP-1055) results in a Mooney viscosity of 78 at 5 minutes. Hence, it is shown that in the presence of the tackifiers, only a marginal cure, if any, occurs with unbrominated resins. Increasing the treating time results in no substantial improvement.

EXAMPLE 3

The experiments of Example 2 were repeated using as the tackifier pentalyn HR, a pentaerythritol ester of rosin manufactured by Hercules Powder Co., having a softening point of 104° C. and an acid number of 13 and a specific gravity at 25/25° C. of 1.07. The results of these experiments are shown in Table III.

TABLE III.—HEAT TREATED BUTYL—COMPARISON OF BROMINATED AND NON-BROMINATED RESIN HEAT TREATMENT IN THE PRESENCE OF A MODIFIED WOOD ROSIN

| Compound | A | B | C | D |
|---|---|---|---|---|
| Ingredients: | | | | |
| Enjay Butyl 356 | 100 | 100 | 100 | 100 |
| SP-1045 (non-brominated) | | | 2.5 | 2.5 |
| SP-1055 (brominated) | | 2.5 | | |
| Pentalyn H [1] | 15 | 15 | 15 | 15 |
| Heat treated: | | | | |
| At (in ° F.) | | 325 | 325 | 325 |
| For (in minutes) | | 5 | 5 | 10 |
| Mooney viscosity (ml. at 260° F.): | | | | |
| 1 plus 3 minute reading | 30 | 78 | 45 | 46 |
| 1 plus 10 minute reading | 28 | 76 | 41 | 45 |

[1] Pentaerythritol ester of rosin.

It will be noted that in the presence of the tackifier no substantial cure occurs with the phenol aldehyde resin (Compound C). Doubling the cure time from 5 to 10 minutes has no significant effect (Compound D). Conversely, at 5 minutes in the presence of the brominated resin an adequate cure, i.e. 78 Mooney viscosity at 260° F., is accomplished.

EXAMPLE 4

In order to determine the effect of resin concentration on cure as measured by Mooney viscosity, blends at varying concentrations of brominated phenol aldehyde resin were prepared and cured for 5 minutes at 325°. The results are shown in Table IV.

TABLE IV.—HEAT TREATED BUTYL—EFFECT OF CURING RESIN CONCENTRATION ON HEAT TREATED POLYMER VISCOSITY

| Compound | A | B | C | D | E |
|---|---|---|---|---|---|
| Ingredients: | | | | | |
| Enjay Buytl 365 | 100 | 100 | 100 | 100 | 100 |
| SP-1055 (brominated resin) | 0 | 1 | 1.5 | 2 | 2.5 |
| Heat Treated: | | | | | |
| At (in. ° F.) | 325 | 325 | 325 | 325 | 325 |
| For (in minutes) | 5 | 5 | 5 | 5 | 5 |
| Mooney Viscosity (ml. at 260° F.): | | | | | |
| 1 plus 3 minute reading | 34 | 85 | 97 | 101 | 103 |
| 1 plus 10 minute reading | 29 | 80 | 93 | 98 | 99 |

It is readily apparent that increasing the resin content causes an increase in the degree of cure as measured by the Mooney viscosity.

EXAMPLE 5

The effect of higher concentrations of polyterpene resins on the degree of cure was determined on various butyl rubber blends cured in the presence of brominated phenol aldehyde resin. These data are shown in Table V.

TABLE V.—HEAT TREATED BUTYL—CONTAINING HIGHER CONCENTRATIONS OF POLYTERPENE RESIN

| Compound | A | B | C | D |
|---|---|---|---|---|
| Ingredients: | | | | |
| Enjay Butyl 365 | 100 | 100 | 100 | 100 |
| Piccolyte S-70 [1] | | 5 | | |
| Piccolyte S-115 | 25 | | 25 | 25 |
| Flexon 845 [2] | | 20 | | |
| SP-1055 (brominated resin) | 2.0 | 2.5 | 2.5 | 3.0 |
| Heat treated: | | | | |
| At (in. ° F.) | 325 | 325 | 325 | 325 |
| For (in minutes) | 5 | 5 | 5 | 5 |
| Mooney Viscosity (ml. at 260° F.): | | | | |
| 1 plus 3 minute reading | 54 | 63 | 64 | 69 |
| 1 plus 10 minute reading | 51 | 56 | 60 | 63 |
| Percent extractables [3] | 75 | | 63 | 50 |
| Percent bound rubber [4] | 45 | | 57 | 70 |

[1] A polyterpene resin based on β-pinene having a softening point of about 70° C.
[2] Flexon 845 is a paraffinic process oil ASTM type 104 (Humble Oil & Refining Co.) having a viscosity of 43.4 SUS at 210° F.
[3] Weight percent of 1 g. of compound which can be dissolved in 100 cc. of cyclohexane in 24 hours.
[4] 100 (percent extractables-percent non-rubber).

It was found that at about the 25% tackifier level, preferably about 2.5 to about 3.0 parts per 100 of brominated resin is used. In these highly extended compositions, i.e. 25 phr. diluent, absolute values of Mooney viscosity or percent extractables is misleading. Percent bound rubber represents the actual percent of rubber which has been crosslinked. The Mooney viscosity is only meaningful when related to similar uncured compositions. A comparison of Compounds B, C and D shows that where the curative is brominated phenol aldehyde resin, terpenes have no more effect on cure than a process oil.

EXAMPLE 6

Although phenol aldehyde resins will not in themselves cure butyl rubber-tackifier blends, it has been found that the addition of halide containing activators will result in such a cure. Various butyl rubber blends were cured using phenol aldehyde resin, brominated phenol aldehyde resin and a phenol aldehyde resin in conjunction with a metal halide. These results are shown in Table VI.

TABLE VI.—HEAT TREATED BUTYL-POLYTERPENE BLENDS

| Compound | A | B | C |
|---|---|---|---|
| Ingredients: | | | |
| Enjay Butyl 365 | 100 | 100 | 100 |
| ST 5070 [1] | 5 | 5 | 5 |
| SP-1045 | 2 | | 2 |
| SP-1055 | | 2 | |
| Stannous chloride | | | 1 |
| Heat treated: | | | |
| At (° F.) | 325 | 325 | 325 |
| For (mininute) | 5 | 5 | 5 |
| Mooney viscosity (ml. at 260° F.): | | | |
| 1 plus 3 minute reading | 48 | 89 | 94 |
| 1 plus 10 minute reading | 42 | 81 | 88 |

[1] A polyterpene resin having a softening point of 70° C. (Schenectady Chemical Co.).

It is evident that although the phenol aldehyde resin does not result in a cure, the addition of stannous chloride activator results in a cure equivalent to that of the brominated phenol aldehyde resin. Metal halide activated cures are not preferred, however, since these systems cause equipment corrosion.

It will be obvious to one skilled in the art that many variations and applications of this invention may be employed without departing from the spirit thereof. Hence, it is not intended to limit the scope of this invention by the examples disclosed herein.

What is claimed is:

1. An adhesive base consisting essentially of:
   (a) a major portion of a rubbery polymer comprising about 85–99.5% of a combined isoolefin having about 4 to 7 carbon atoms and about 0.5 to about 15% of combined multiolefin having about 4 to 14 carbon atoms;
   (b) about 3 to about 60 parts per hundred, based on the rubber, of a tackifier-diluent selected from the group consisting of polyterpene resins, wood rosins, rosin esters and non-reactive phenol formaldehyde resins; and
   (c) a curing agent selected from the group consisting of (1) a halogenated phenol aldehyde resin and (2) a phenol aldehyde resin and a halide containing activator selected from the group consisting of zinc chloride, stannous chloride, ferric chloride, butyl tin trichloride or a zeolitic molecular sieve having adsorbed thereon an acid selected from the group consisting of HI, HBr, HCl, trifluoroacetic acid and chloroacetic acid.

2. The composition of claim 1 wherein the tackifier is present at about 5 to 25 phr. and the curing agent is a brominated phenol aldehyde resin present at about 1 to about 5 phr.

3. The composition of claim 1 wherein the tackifier-diluent is polyterpene resin or pentaerythritol ester of hydrogenated rosin.

4. The composition of claim 1 wherein the curing agent comprises about 0.5 to about 5 phr. of a phenol aldehyde resin and about 0.1 to about 3.0 phr. of a halide containing activator.

5. The adhesive base of claim 1 having incorporated therein an additional diluent comprising a process oil at about 3 to about 15 phr., based on the rubber, with the proviso that the quantity of process oil incorporated therein does not exceed the quantity of tackifier-diluent in the adhesive base.

References Cited

UNITED STATES PATENTS

| | | | |
|---|---|---|---|
| 2,476,430 | 7/1949 | Robbins | 260—27 |
| 2,701,895 | 2/1955 | Tawney et al. | 18—45 |
| 3,093,613 | 6/1963 | Fusco et al. | 260—38 |
| 3,165,496 | 1/1965 | Fusco et al. | 260—59 |
| 2,996,465 | 8/1961 | Phillips | 260—846 |
| 2,356,128 | 8/1944 | Thomas et al. | 260—889 |

OTHER REFERENCES

Skeist, I., "Handbook of Adhesives," 1962 (pp. 221 to 228 relied on),

DONALD E. CZAJA, Primary Examiner

W. E. PARKER, Assistant Examiner

U.S. Cl. X.R.

26—844, 846